Sept. 24, 1940.　　　　S. R. OGILBY　　　　2,215,561
METHOD OF FORMING RUBBER ARTICLES
Filed April 7, 1939
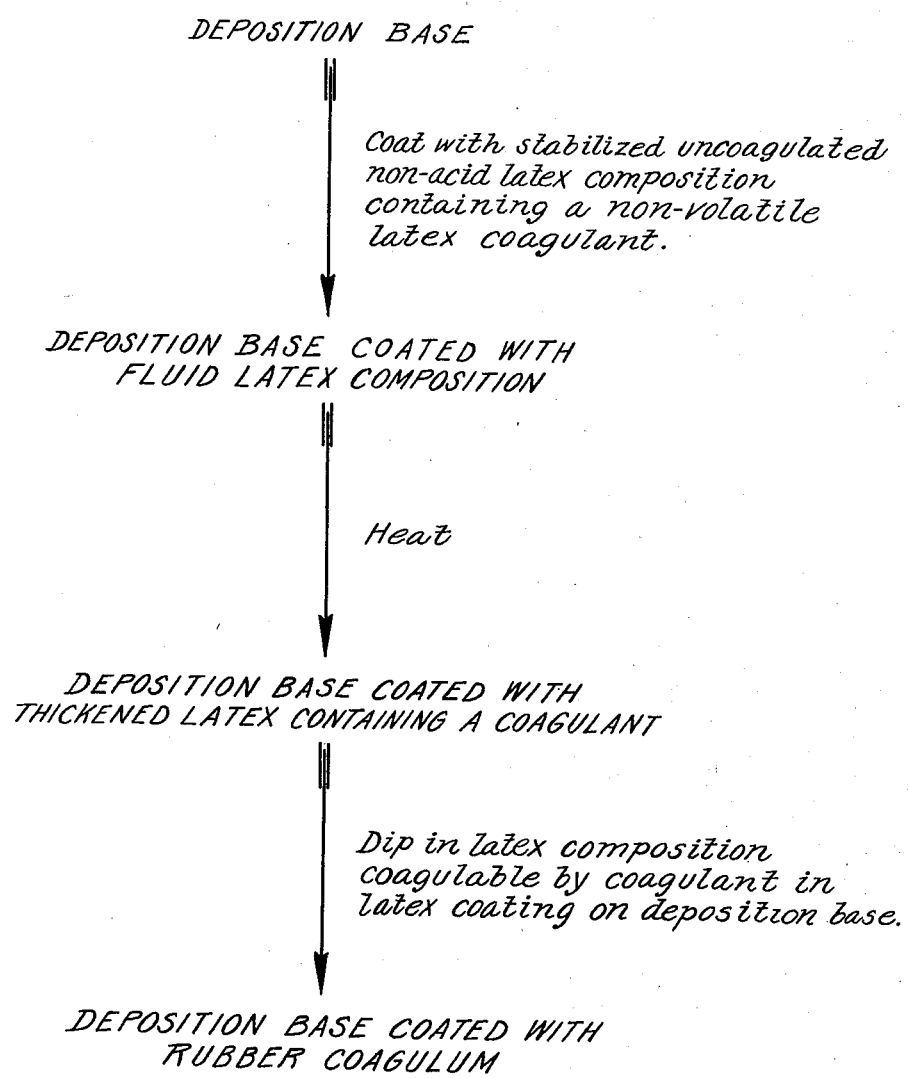
INVENTOR.
STEWART R. OGILBY
BY
ATTORNEY Patented Sept. 24, 1940

2,215,561

UNITED STATES PATENT OFFICE 2,215,561

METHOD OF FORMING RUBBER ARTICLES

Stewart R. Ogilby, Staten Island, N. Y., assignor to United States Rubber Company, New York, N. Y., a corporation of New Jersey Application April 7, 1939, Serial No. 266,533

8 Claims. (Cl. 18—58)

This invention relates to methods of forming rubber articles and more particularly to methods of forming rubber articles directly by deposition of rubber from latex.

In my prior Patent 1,969,275 there is described a method of producing rubber articles by coating a form or deposition base with a fluid rubber cement containing an aqueous solution of a latex coagulant and a proportion of alcohol relative to the rubber solvent insufficient to cause incipient flocculation of the rubber, allowing the volatile constituents of the composition to evaporate until the coating sets to a non-flowing gel or porous rubber layer, and then associating the thus treated base with latex as by an immersion process for a time sufficient to deposit the desired amount of coagulum on the form by migration of the coagulant into the latex. The rubber deposits formed in this manner may be dried and stripped from the form, or may remain as a coating on the base as part of the finished article. This process has many advantages over the prior processes of forming rubber articles by direct deposition from latex as fully discussed in the prior patent. The utilization, however, of rubber solvents, such as naphtha, to produce the rubber cement, and of desolvating agents, such as alcohol, to maintain the rubber cement and coagulant composition fluid until after the evaporation of the solvent on the base produces flocculation of the rubber and setting of the film, are undesirable from a cost and hazard viewpoint.

The present invention is an improvement over the process of my prior Patent 1,969,275 and provides a method of surfacing a form or deposition base with a uniform film of rubber and coagulant for subsequent treatment with conventional latex compositions without the disadvantageous use of volatile organic solvents and desolvating agents.

The present invention is also an improvement over the process of the prior art where a form is first coated with an acid latex and then associated with an alkaline latex which is coagulable by the acid retained in the acid latex. Such prior process is not satisfactory where an accelerator is used in compounding the latex which is retarded or inactivated under acid conditions. Further in such prior process where a volatile acid is used in preparing the acid latex, a heating of the acid latex on the surface of the form to increase the consistency of the acid latex and facilitate the dipping operation will inherently volatilize some or all of the acid.

According to the present invention, the base upon which the rubber article is to be formed, or which is to become a permanent part of the rubber article, is coated with a non-acid latex composition containing a non-volatile latex coagulant and a stabilizer against coagulation of the latex by the coagulant. The consistency of this coating is preferably increased as by partial or complete drying, or as by heating as in the case of a heat sensitive latex, in order to give a more uniform gauge in the final product. The thus treated base is then associated with a latex composition that is coagulable by the coagulant in the first latex coating, as by dipping until the desired thickness of coagulum has been deposited.

The following is an example of the present invention and is intended to be an illustration of the same and not restrictive thereof. A non-acid latex composition containing a latex coagulant and a stabilizer was prepared according to the following formula:

|  | | Parts by weight |
|---|---|---|
| Latex | Rubber | 100 |
|  | Water | 61 |
|  | NH₃ | .9 |
| 20% aqueous solution of "Aquarex D" | | 20 |
| 15% aqueous solution of acetic acid | | 15 |
| 25% aqueous solution of magnesium acetate | | 100 |
| Water | | 58 |

The magnesium acetate used was C. P. hydrous and the percentage given in the above formula was calculated on the basis of anhydrous magnesium acetate. The above composition had a pH between 8.0 and 8.1. "Aquarex D" is the trade name of a stabilizer which is the mono sodium sulphate ester of one-half lauryl and one-half myristyl alcohol. Glass forms were dipped into the above coagulant latex composition, removed, and dried over night at room temperature. The deposits had a dry gauge of .006 inch. The forms were dipped for various lengths of time in the following conventional latex dipping compound:

|  | | Parts by weight |
|---|---|---|
| Latex | Rubber | 100 |
|  | Water | 61 |
|  | NH₃ | .9 |
| 20% aqueous solution of KOH | | 1.3 |
| 37% aqueous solution of formaldehyde | | 5 |
| 20% aqueous solution of potassium oleate | | 2.5 |
| Sulphur | | .5 |
| Zinc oxide | | 1 |
| Accelerator | | 1 |
| Antioxidant | | .5 |
| Water to 57% solids. | | |

For an immersion of the forms coated with coagulant latex in the above dipping composition for one minute, there was formed a deposit which when dried had a total gauge of .02 inch; a three minute immersion gave a deposit which when dried had a gauge of .03 inch; a six minute immersion gave a dry deposit of .04 inch; while a fifteen minute immersion gave a dry deposit of .06 inch. The films on the various forms did not vary more than .002 inch over their entire surface. The coagulant latex deposit may be only partially dried, if desired, instead of completely dried before dipping in the latex dipping composition.

If desired, further alternate dips into the coagulant latex and into the dipping compound may be utilized to build up greater thicknesses of deposit than is readily obtainable in a single dip into each of the latex compounds in a reasonably short time. If the rubber deposit is to form a permanent coating on the base, the rubber is preferably vulcanized on the base. If the rubber article is to be stripped from the base or form, vulcanization may be made to take place before or after the stripping operation. The latex may, if desired, be prevulcanized. The coagulant latex composition and the latex compound that is coagulable by the coagulant latex composition may be applied to the base by dipping, spreading, spraying or the like operations.

Various non-acid latex coagulants besides the magnesium acetate illustrated above, may be used in preparing the coagulant latex composition. For example, the well known coagulant di- or trivalent metal salts, such as zinc acetate, calcium chloride, magnesium acetate, magnesium sulphate, calcium sulphate, and the like, may be used. Various well known stabilizers against coagulation of the coagulant latex other than the "Aquarex D" shown above may be used. For example, saponin is satisfactory, as well as many surface active agents which are sold under trade names such as "Duponol CA," "Gardinol CA" and "Orvus CA" which are reported to be sodium sulphate esters of lauryl or other similar aliphatic alcohols, "Lohrinol" which is believed to be a sodium salt of a long chain alcohol sulphate, "Igepon T" which is reported to be the sodium salt of an oleyl derivative of taurine, "Nacconal LA" which is reported to be the sodium salt of a sulphonated ethyl ether of a long chain fatty alcohol, and "Nekal A" which is reported to be the crude sodium salt of octa hydro-anthracene mesa sulphonic acid.

The term "latex" in the description and claims is used to designate broadly coagulable aqueous dispersions of elastic materials, including artificial dispersions of rubber or rubber-like materials as well as natural latex, which may be preserved or compounded or otherwise treated as desired as by vulcanization and which may be in a normal, diluted, concentrated or purified condition produced by methods well known in the art.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method which comprises coating a base with a stabilized uncoagulated non-acid latex composition containing a non-volatile latex coagulant, heating to increase the consistency of the latex coating, and associating the thus coated base with a second latex composition coagulable by the coagulant in said first latex composition.

2. The method which comprises coating a base with an alkaline latex composition containing a non-volatile latex coagulant and a stabilizer against coagulation of said latex composition by said coagulant, heating to increase the consistency of the latex coating, and associating the thus coated base with a second latex composition coagulable by the coagulant in said first latex composition.

3. The method which comprises coating a base with a stabilized uncoagulated non-acid latex composition containing a non-volatile latex coagulant, heating to at least partially dry the latex coating, and associating the thus coated base with a second latex composition coagulable by the coagulant in said first latex composition.

4. The method which comprises coating a base with an alkaline latex composition containing a non-volatile latex coagulant and a stabilizer against coagulation of said latex composition by said coagulant, heating to at least partially dry the latex coating, and associating the thus coated base with a second latex composition coagulable by the coagulant in said first latex composition.

5. The method which comprises dipping a form in a stabilized uncoagulated non-acid latex composition containing a non-volatile latex coagulant, heating to increase the consistency of the latex coating, dipping the thus coated form in a second latex composition coagulable by the coagulant in said first latex composition, and maintaining the form in said second latex composition until the desired thickness of rubber deposit has been built up on the form.

6. The method which comprises dipping a form in an alkaline latex composition containing a latex coagulant and a non-volatile stabilizer against coagulation of said latex composition by said coagulant, heating to increase the consistency of the latex coating, dipping the thus coated form in a second latex composition coagulable by the coagulant in said first latex composition, and maintaining the form in said second latex composition until the desired thickness of rubber deposit has been built up on the form.

7. The method which comprises dipping a form in a stabilized uncoagulated non-acid latex composition containing a non-volatile latex coagulant, heating to at least partially dry the latex coating, dipping the thus coated form in a second latex composition coagulable by the coagulant in said first latex composition, and maintaining the form in said second latex composition until the desired thickness of rubber deposit has been built up on the form.

8. The method which comprises dipping a form in an alkaline latex composition containing a latex coagulant and a non-volatile stabilizer against coagulation of said latex composition by said coagulant, heating to at least partially dry the latex coating, dipping the thus coated form in a second latex composition coagulable by the coagulant in said first latex composition, and maintaining the form in said second latex composition until the desired thickness of rubber deposit has been built up on the form.

STEWART R. OGILBY.